United States Patent
Kobayashi et al.

[11] Patent Number: 6,148,949
[45] Date of Patent: Nov. 21, 2000

[54] ELECTRIC POWER STEERING APPARATUS

[75] Inventors: Akio Kobayashi; Osamu Tsurumiya; Takao Kurosawa; Nobuo Sugitani, all of Wako, Japan

[73] Assignee: Honda Giken Kogyo Kabushiki Kaisha, Tokyo, Japan

[21] Appl. No.: 09/127,078

[22] Filed: Jul. 31, 1998

[30] Foreign Application Priority Data

Aug. 27, 1997 [JP] Japan .................................. 9-231452

[51] Int. Cl.[7] ........................................................ B62D 5/04
[52] U.S. Cl. .......................... 180/446; 180/443; 180/404; 701/41
[58] Field of Search ................................ 180/443, 446, 180/442, 404; 701/36, 41, 42, 43, 44; 318/432

[56] References Cited

U.S. PATENT DOCUMENTS

| | | | |
|---|---|---|---|
| 4,660,671 | 4/1987 | Behr et al. | 180/142 |
| 4,727,950 | 3/1988 | Shimizu et al. | 180/79.1 |
| 4,730,686 | 3/1988 | Shimizu | 180/79.1 |
| 4,753,309 | 6/1988 | Marumoto et al. | 180/79.1 |
| 4,869,333 | 9/1989 | Morishita et al. | 180/79.1 |
| 4,972,320 | 11/1990 | Sugiura et al. | 364/424.05 |
| 5,039,926 | 8/1991 | Morishita et al. | 318/434 |
| 5,040,630 | 8/1991 | Morishita et al. | 180/79.1 |
| 5,065,325 | 11/1991 | Takahashi | 364/424.05 |
| 5,236,335 | 8/1993 | Takeuchi et al. | 180/79.1 |
| 5,414,627 | 5/1995 | Wada et al. | 364/424.05 |
| 5,448,482 | 9/1995 | Yamamoto et al. | 364/424.05 |
| 5,473,539 | 12/1995 | Shimizu et al. | 364/424.05 |
| 5,528,497 | 6/1996 | Yamamoto et al. | 364/424.05 |
| 5,596,252 | 1/1997 | Shimizu et al. | 318/432 |
| 5,612,877 | 3/1997 | Shimizu et al. | 364/424.05 |
| 5,912,539 | 6/1999 | Sugitani et al. | 318/434 |
| 5,927,430 | 7/1999 | Mukai et al. | 180/446 |
| 5,969,919 | 10/1999 | Kobayashi et al. | 361/23 |
| 6,018,691 | 1/2000 | Yamamoto et al. | 701/41 |

*Primary Examiner*—Paul N. Dickson
*Assistant Examiner*—Daniel Yeagley
*Attorney, Agent, or Firm*—Merchant & Gould P.C.

[57] ABSTRACT

Electric power steering apparatus includes a control unit for setting a motor control signal to control operation of an electric power assisting motor on the basis of at least steering torque detected by a steering torque sensor and a vehicle velocity detected by a vehicle velocity sensor. The control unit includes a steering torque estimating section for estimating the steering torque on the basis of the vehicle velocity detected by the vehicle velocity sensor and a steering angle detected by a steering angle sensor. When the steering torque sensor is out of order or malfunctioned, the control unit controls the operation of the electric motor on the basis of the steering torque estimated by the steering torque estimating section.

2 Claims, 7 Drawing Sheets

ELECTRIC POWER STEERING APPARATUS

BACKGROUND OF THE INVENTION

1. Field of the Invention

The present invention relates generally to electric power steering apparatuses for automotive vehicles which provide a steering assist of an electric motor directly to the vehicle steering system to reduce a manual steering effort to be applied by a vehicle driver, and more particularly to an improved electric power steering apparatus which, when its steering torque sensor is out of order or not working properly, can estimate steering torque on the basis of a detected vehicle velocity and steering angle so as to permit a continued controlled operation of the assisting motor on the basis of the estimated steering torque.

2. Description of the Related Art

Electric power steering apparatuses are widely used today which set a target motor current on the basis of a steering torque signal and vehicle velocity signal to drive an electric power assisting motor on the basis of the thus-set target motor current. Specifically, these electric power steering apparatuses feed back a current actually flowing through the motor to minimize an offset between the target motor current and the actual motor current so that feedback control is performed for driving the motor to constantly give an appropriate steering assist to the vehicle steering system. The electric power steering apparatuses control the assisting motor in any of various manners, such as in response to detection of a varying vehicle velocity or number of engine rotations; that is, such motor control schemes are generally arranged to modify output power from the motor on the basis of a detected vehicle velocity and number of engine rotations.

However, because all of these motor control schemes are based primarily on output signals from the steering torque sensor, the electric power steering apparatuses would encounter various inconveniences when the steering torque sensor is out of order or not working properly. Particularly, because of their dependence on the steering torque sensor and vehicle velocity sensor, the electric power steering apparatuses can not properly control the assisting motor when the steering torque sensor is not working.

To avoid the inconveniences, there have been proposed improved electric power steering apparatuses, which use duplicate sets of steering torque sensors, vehicle velocity sensors and CPUs to provide a necessary steering assist from the motor to the steering system in a so-called fail-safe fashion. But, the duplicate provision of the steering torque sensors, vehicle velocity sensors and CPUs would significantly increase the cost of the apparatuses. Besides, in case the main and subsidiary steering sensors both break down, it would no longer be possible to properly control the assisting motor.

SUMMARY OF THE INVENTION

It is therefore an object of the present invention to provide an electric power steering apparatus which, when its steering torque sensor is out of order or not working, can estimate steering torque on the basis of a vehicle velocity and steering angle so as to drive an electric power assisting motor on the basis of the estimated steering torque.

According to the present invention, there is provided an electric power steering apparatus for use with an automotive vehicle, which comprises: an electric motor for applying an electric steering assist to a steering system of the vehicle; a steering angle sensor for detecting a steering angle in the steering system; a steering torque sensor for detecting steering torque in the steering system; a vehicle velocity sensor for detecting a velocity of the vehicle; a control unit for setting a motor control signal to control operation of the electric motor on the basis of at least the steering torque detected by the steering torque sensor and the vehicle velocity detected by the vehicle velocity sensor; a motor drive for driving the motor on the basis of the motor control signal set by the control unit; and a steering torque estimating section provided in the control unit for estimating the steering torque on the basis of the vehicle velocity detected by the vehicle velocity sensor and the steering angle detected by the steering angle sensor. Thus, when the steering torque sensor is judged to be out of order or malfunctioned, the control unit controls the operation of the electric motor on the basis of the steering torque estimated by the steering torque estimating section. Consequently, the controlled operation of the motor can be continued irrespective of the failure of the steering torque sensor.

In a preferred implementation, the steering torque estimating section estimates the steering torque by calculating a sum between a value corresponding to the vehicle velocity and the steering angle and a value corresponding to the vehicle velocity and twice differentiated steering angle and then modifying the calculated sum.

BRIEF DESCRIPTION OF THE DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

Figure 1:
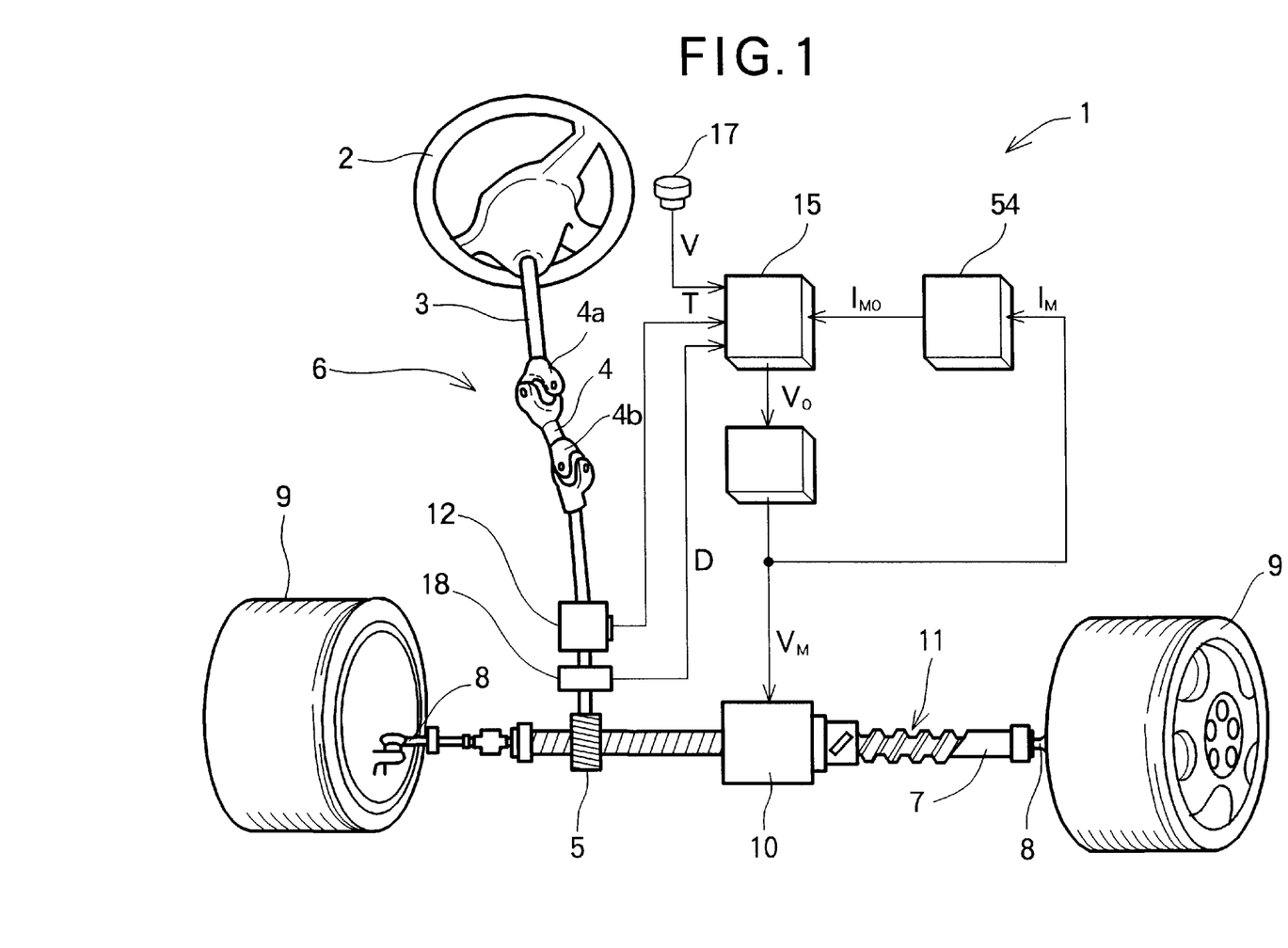
FIG. 1 is a diagram showing an exemplary general arrangement of an electric power steering apparatus according to the present invention.

FIG. 1 is a block diagram showing an exemplary general setup of an electric power steering apparatus for use with an automotive vehicle according to the present invention. The electric power steering apparatus 1 comprises a manual steering power generation unit 6, which includes a steering shaft 3 that is integrally connected at one end to a steering wheel 2 and connected at the other end, via a connecting shaft 4 having universal joints 4a and 4b, to a rack-and-pinion steering gear mechanism 5 enclosed within a steering gear box. The steering gear mechanism converts rotary movements of the steering shaft 3 into linear reciprocating movements of a toothed rack shaft 7 that is connected to steered left and right front wheels 9 via tie rods 8. To reduce a vehicle driver's steering effort to be manually applied via the manual steering power generation unit 6, an electric power assisting motor 10 and ball thread mechanism 11 are provided coaxially with the rack shaft 7, so that an electric steering assist from the motor 10 is converted via the mechanism 11 into thrust acting on the rack shaft 7.

The steering gear box also contains a steering torque sensor 12 for detecting manually-applied torque and a steering angle sensor 18 for detecting an rotational angle of the steering shaft 3, which generate a steering torque signal T and a steering angle signal D, respectively, to be fed to an electronic control unit 15. The electric power steering apparatus of the invention further includes a vehicle velocity sensor 17 for detecting a velocity of the automotive vehicle, which generates and feeds a vehicle velocity signal V to the electronic control unit 15.

In the illustrated example, the steering torque sensor 12 comprises a potentiometer for transforming torsion of a torsion bar, corresponding to a change in the operating angle of the steering wheel, into voltage, the vehicle velocity sensor 17 comprises a magnet and a coil disposed in opposed relation to the magnet, a reed switch or the like, and the steering angle sensor 18 comprises a combination of a slitted rotating disk and a photo coupler.

Figure 2:
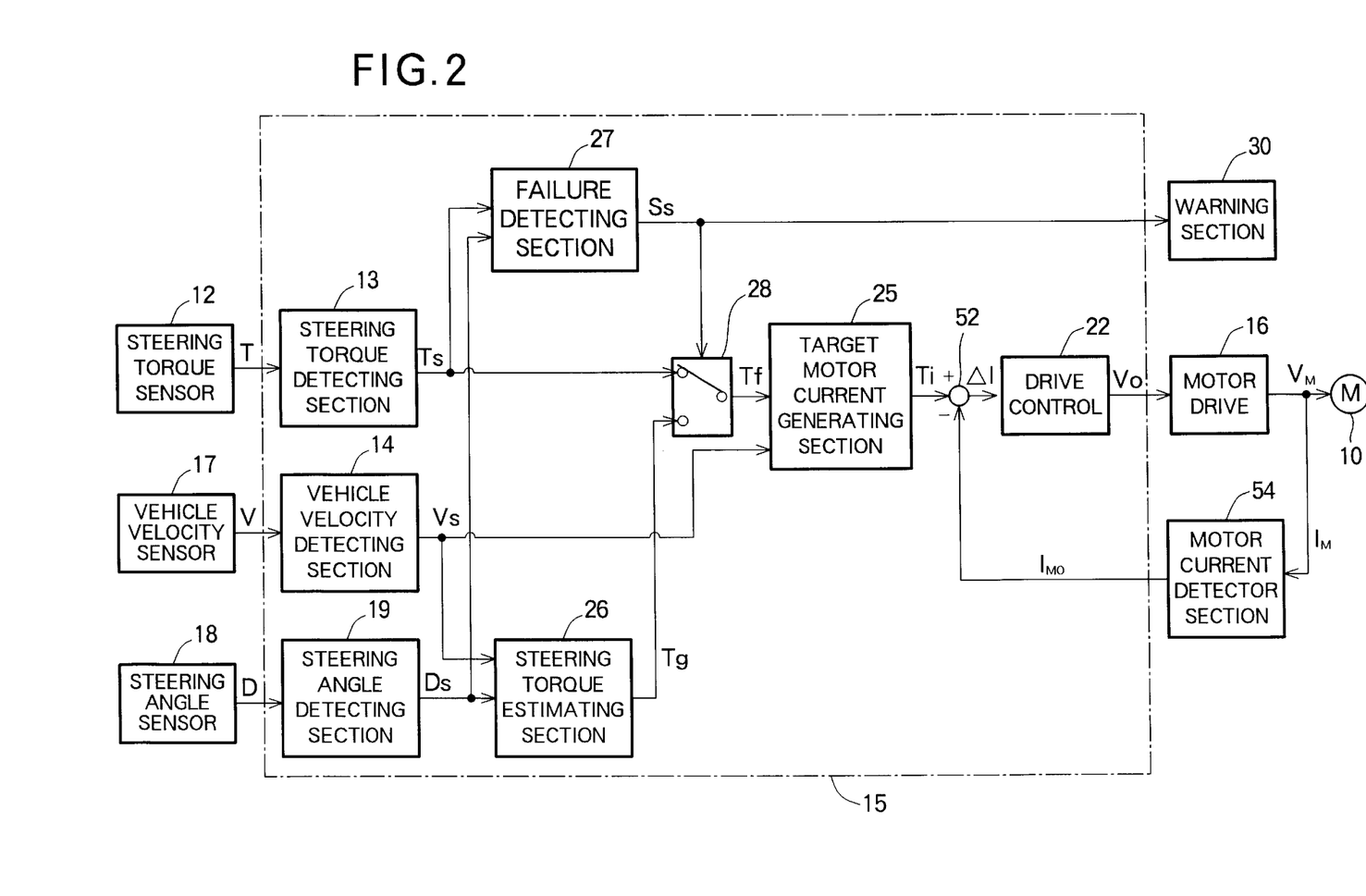
FIG. 2 is a block diagram showing principal electrical components of the electric power steering apparatus in accordance with a first embodiment of the present invention.

FIG. 2 is a block diagram showing principal electrical components of the electric power steering apparatus in accordance with a first embodiment of the present invention, which includes the steering torque sensor 12, vehicle velocity sensor 17, steering angle sensor 18, control unit 15, motor drive 16, motor current detector section 54, assisting motor 10 and warning section 30.

The control unit 15, preferably implemented by a microprocessor, comprises various arithmetic operation processing sections and a memory as will be later described in detail. The control unit 15 generates a target motor current signal corresponding at least to a steering torque signal T and then feeds a motor control signal Vo based on the target motor current signal to the motor drive 16, which in turn drives the motor 10 by a motor voltage $V_M$ using the known PWM (Pulse Width Modulation) control scheme. When a steering angle signal D is being output from the steering angle sensor 18 with no output from the steering torque signal T (T=0), the control unit 15 determines that the steering torque sensor 12 is out of order or not working and calculates estimated steering torque corresponding to the vehicle velocity signal V and steering angle signal D, so as to control the motor 10 in accordance with the estimated steering torque and vehicle velocity signal V. The control unit 15 also outputs a warning upon detection of a breakdown or failure of the steering torque signal 12.

In the illustrated example, the motor drive 16 comprises a bridge circuit made up of four switching devices, such as FETs (Field Effect Transistors) or IGBTs (Insulated-Gate Bipolar Transistors), which generates the motor voltage $V_M$, corresponding to the motor control signal Vo (PWM control signal), and supplies the motor 10 with a motor current $I_M$, corresponding to the absolute value and direction of the steering torque T, so as to drive the motor drive 16 in the forward or reverse direction depending on the steering torque signal T. Motor current detector section 54 identifies the motor current $I_M$ actually flowing through the assisting motor 10 by detecting potential via a low resistance connected between the section 54 and the motor 10, so as to pass a detected motor current signal $I_{MO}$ to the control unit 15 for negative feedback to the target motor current signal.

More specifically, the control unit 15 comprises a steering torque detecting section 13, a vehicle velocity detecting section 14, a steering angle detecting section 19, a target motor current generating section 25, a steering torque estimating section 26, a motor drive control section 22, a failure detecting section 27, a subtracter 52 and a selector switch 28.

The steering torque detecting section 13 generates a steering torque detection signal Ts and a direction signal on the basis of the absolute value of the steering torque signal T from the sensor 12, which are fed via the selector switch 28 to the target motor current generating section 25 for motor torque control and are also sent to the failure detecting section 27. The vehicle velocity detecting section 14 generates a vehicle velocity detection signal Vs and a direction signal on the basis of the absolute value of the vehicle velocity signal V from the sensor 17, which are fed to the target motor current generating section 25 for motor torque control corresponding to the vehicle velocity and are also sent to the steering torque estimating section 26. Further, the steering angle detecting section 19 generates a steering angle detection signal Ds and a direction signal on the basis of the absolute value of the steering angle signal from the sensor 18, which are fed to the steering torque estimating section 26 for motor torque control corresponding to the vehicle velocity and are also sent to the failure detecting section 27.

The steering torque estimating section 26, which includes a memory such as a ROM, generates first estimated torque Ts1 corresponding to the vehicle velocity detection signal Vs and a steering angle θs calculated from the steering angle detection signal Ds, and second estimated torque Ts2 corresponding to the vehicle velocity detection signal Vs and a steering angle acceleration of the steering angle θs calculated from the steering angle detection signal Ds. The steering torque estimating section 26 multiplies the first and second estimated torque Ts1 and Ts2 by first and second coefficients k1 and k2, respectively, where the second coefficient k2 is four times as great as the first coefficient k1 (k2=4k1). Then, the steering torque estimating section 26 adds together the multiplication results to yield an estimated torque signal Tg (=k1×Ts1+k2×Ts2).

Figure 4:
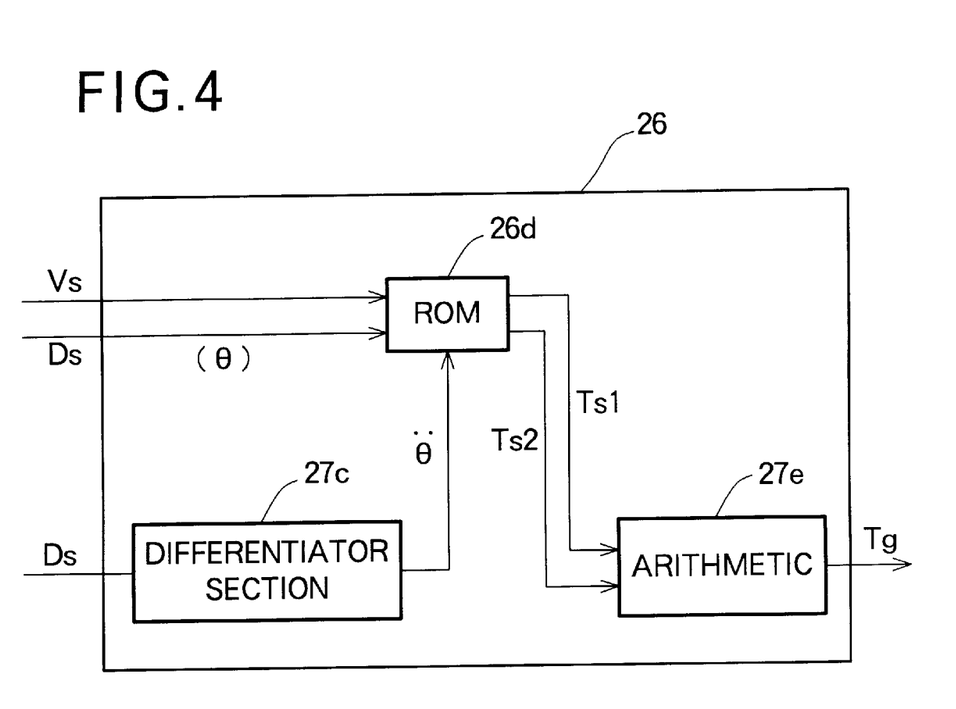
FIG. 4 is a block diagram showing an exemplary detailed construction of a steering torque estimating section employed in the electric power steering apparatus of the present invention.

FIG. 4 is a block diagram showing an exemplary detailed construction of the steering torque estimating section 26, which includes a differentiator section 27c, a ROM 26d and an arithmetic operator section 27e. The differentiator section 27c differentiates twice the steering angle θs calculated from the steering angle detection signal Ds so as to generate a steering angle acceleration signal ($d^2θ/dt^2$) that is then fed to the ROM 26d.

Figure 5A:
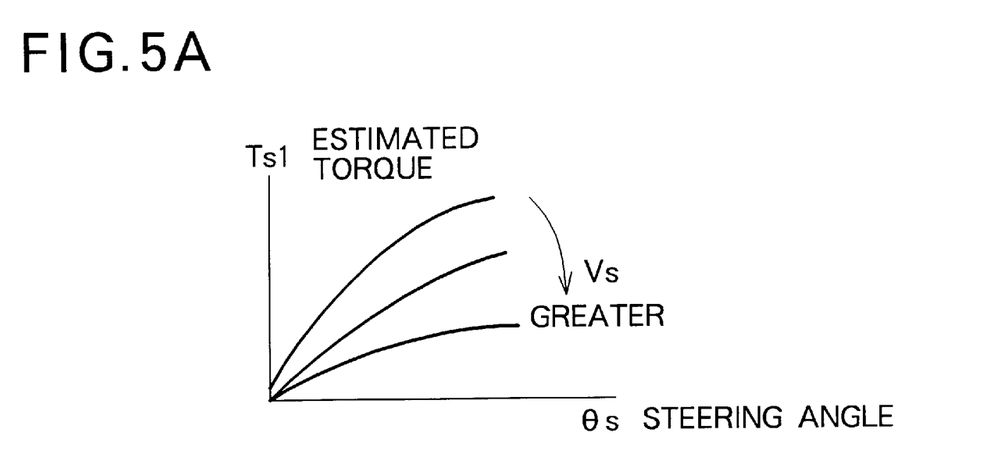
FIGS. 5A and 5B are graphs showing characteristic curves of first and second estimated torque tabled in the steering torque estimating section.
Figure 5B:
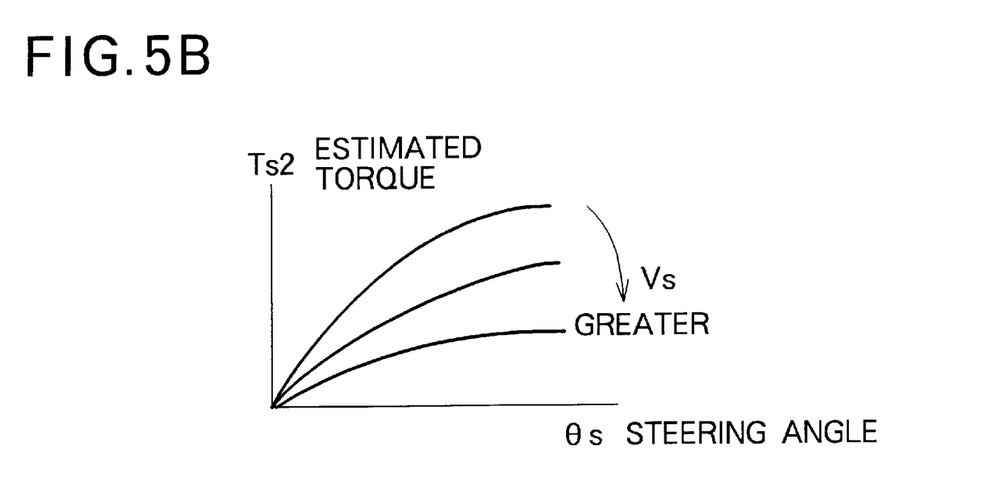

The ROM 26d of the steering torque estimating section 26 has prestored therein a table which, as shown in FIG. 5A, contains values of the first estimated torque Ts1 that correspond to various possible values of the vehicle velocity detection signal Vs and the steering angle θs calculated from the steering angle detection signal Ds and that were obtained through experiments or logical operations. Thus, the steering torque estimating section 26 selectively reads out one of the first estimated torque values Ts1 corresponding to the digitally-converted values of the input vehicle velocity signal V and steering angle signal D and feeds it to the arithmetic operator section 27e. The ROM 26d has prestored therein another table which, as shown in FIG. 5B, contains values of the second estimated torque Ts2 that correspond to various possible values of the vehicle velocity detection signal Vs and the steering angle acceleration calculated by twice differentiating the steering angle θs and that were obtained through experiments or logical operations. Thus, the steering torque estimating section 26 selectively reads out one of the second estimated torque values Ts2 corresponding to the digitally-converted values of the input vehicle velocity signal V and steering angle signal D and feeds it to the arithmetic operator section 27e.

The arithmetic operator section 27e multiplies the first and second estimated torque Ts1 and Ts2 read out from the ROM 26d by the first and second coefficients k1 and k2, respecively, and adds together the multiplication results to yield he above-mentioned estimated torque signal Tg (=k1×Ts1+k2×Ts2). The arithmetic operator section 27e sends the estimated torque signal Tg to the selector switch 28.

Figure 6A:
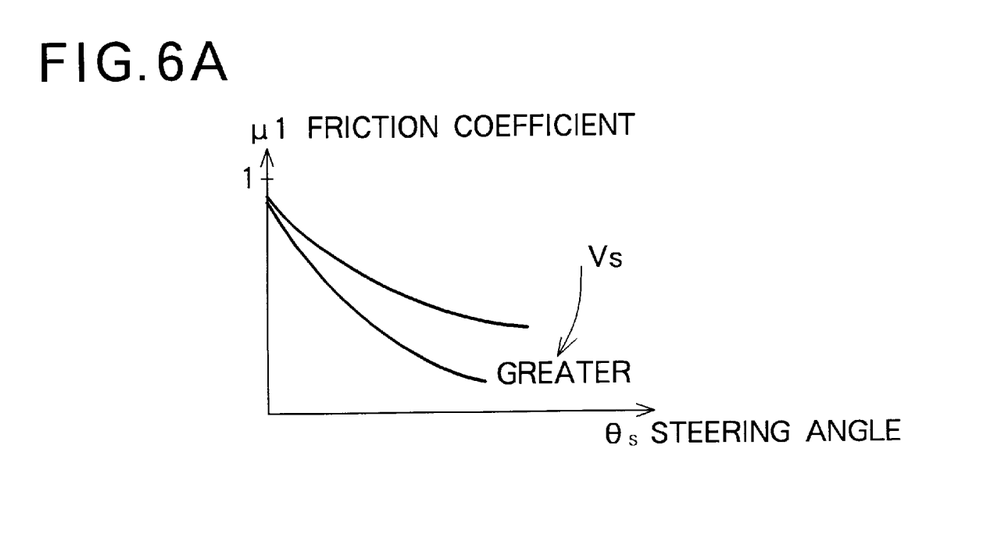
FIGS. 6A and 6B are graphs showing characteristic curves of first and second estimated road-surface friction coefficients tabled in the steering torque estimating section.
Figure 6B:
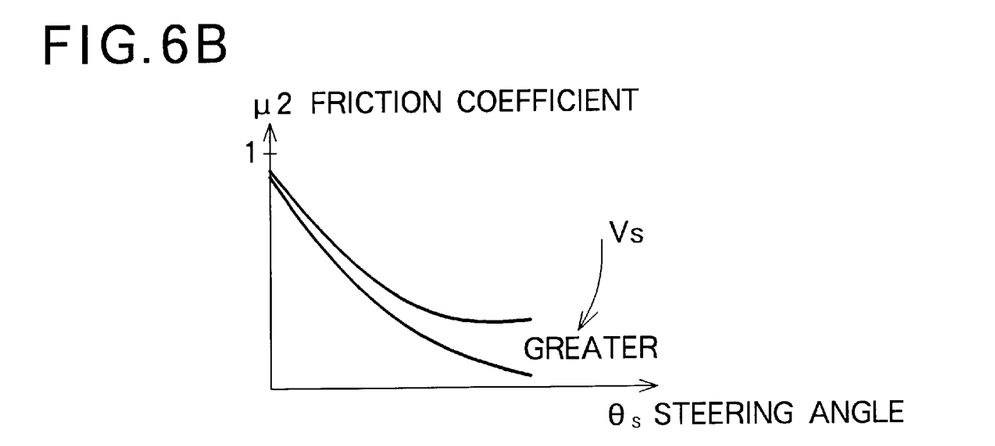

Further, the ROM 26d of the steering torque estimating section 26 has prestored therein still another table which, as shown in FIG. 6A, contains values of first estimated road-surface friction coefficient $\mu 1$ that correspond to various possible values of the vehicle velocity detection signal Vs and the steering angle θs calculated from the steering angle detection signal Ds and that were obtained through experiments or logical operations. Thus, the steering torque estimating section 26 selectively reads out one of the first estimated road-surface friction coefficient values $\mu 1$ corresponding to the digitally-converted values of the input vehicle velocity signal V and steering angle signal D. Also, the ROM 26d has prestored therein still another table which, as shown in FIG. 6B, contains values of second estimated road-surface friction coefficient $\mu 2$ that correspond to various possible values of the vehicle velocity detection signal Vs and the steering angle acceleration calculated by twice differentiating the steering angle θs and that were obtained through experiments or logical operations. Thus, the steering torque estimating section 26 selectively reads out one of the second estimated torque values Ts2 corresponding to the digitally-converted values of the input vehicle velocity signal V and steering angle signal D. Then, the steering torque estimating section 26 modifies the first and second estimated road-surface friction coefficients $\mu 1$ and $\mu 2$ in correspondence with the earlier-selected first and second estimated torque values Ts1 and Ts2, to thereby provide the estimated torque signal Tg.

The failure detecting section 27, which comprises an OR gate, performs an OR operation between the steering torque detection signal Ts from the steering torque detecting section 13 and the steering angle detection signal Ds from the steering angle detecting section 19. Thus, when the steering angle detection signal Ds is being output with no output of the steering torque detection signal Ts (Ts=0), the failure detecting section 27 determines that the steering torque sensor 12 is not working and outputs a failure signal Ss to the warning section 30 as well as to the selector switch 28.

The selector switch 28, having a software-controlled switching function, operates to select the steering torque detection signal Ts when no failure signal Ss is given from the failure detecting section 27, i.e., when the steering torque sensor 12 is functioning properly, but select the estimated steering torque signal Tg when the failure signal Ss is given from the failure detecting section 27, i.e., when the steering torque sensor 12 is not working. The signal Ts or Tg thus selected by the selector switch 28 is then passed to the target motor current generating section 25 as a selected steering torque signal Tf.

Figure 7:
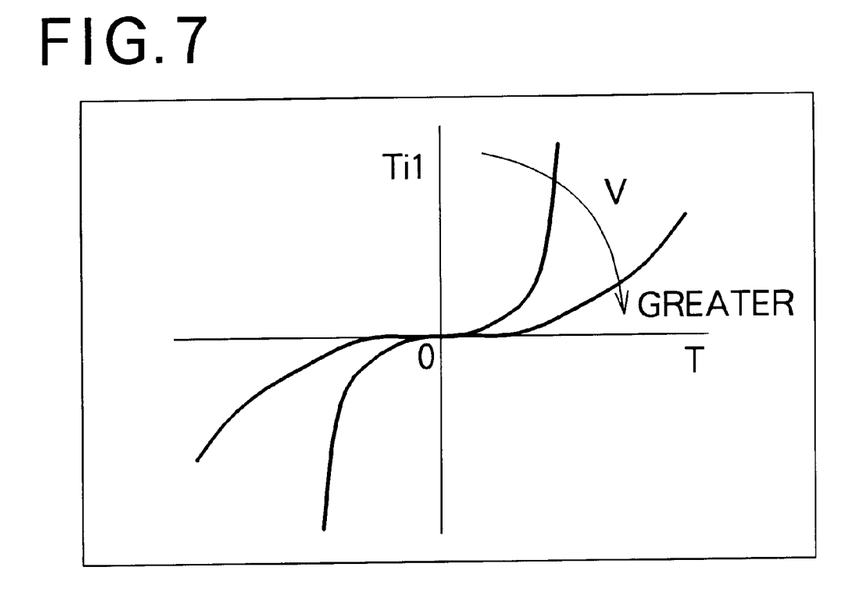
FIG. 7 is a graph showing a characteristic curve of target motor current versus vehicle velocity and steering torque tabled in a target motor current generating section employed in the electric power steering apparatus of the present invention.

The target motor current generating section 25 includes a memory, such as a ROM, stores a table which, as shown in FIG. 7, contains values of target motor current Ti that correspond to various possible values of the vehicle velocity signal V and the steering torque signal T and that were obtained through experiments or logical operations on the basis of the selected steering torque signal Tf passed via the selector switch 28 and the vehicle velocity detection signal Vs. Thus, the target motor current generating section 25 selectively reads out one of the target motor current values Ti corresponding to the input vehicle velocity detection signal Vs and selected steering torque signal Tf (Ts or Tg) and sends it to the drive control section 22 via the subtracter 52.

The subtracter 52 subtracts the detected motor current $I_{MO}$, given from the motor current detector section 54, from the target motor current Ti, to thereby output a difference or offset signal $\Delta I$ (=Ti−$I_{MO}$) to the drive control section 22. In accordance with the offset signal $\Delta I$, the drive control section 22 generates a motor control signal Vo to be supplied to the motor drive 16.

Upon receipt of the failure detection signal Ss from the failure detecting section 27, the warning section 30 warns the vehicle driver and passengers of the unusual condition, i.e., failure, via visual and/or aural displays; the visual display may be by illuminating or flickering a warning lamp and the aural display may be by sounding a buzzer or generating an optional warning sound through a speaker.

As described above, the electric power steering apparatus accordance with the first embodiment of the present invention is characterized in that when the steering torque sensor is not working, the control unit 15 controls the operation of the assisting motor on the basis of estimated steering torque calculated by the steering torque estimating section 26 on the basis of a detected vehicle velocity and steering angle, with the result that the controlled operation of the motor can be continued irrespective of the failure of the steering torque sensor.

Figure 3:
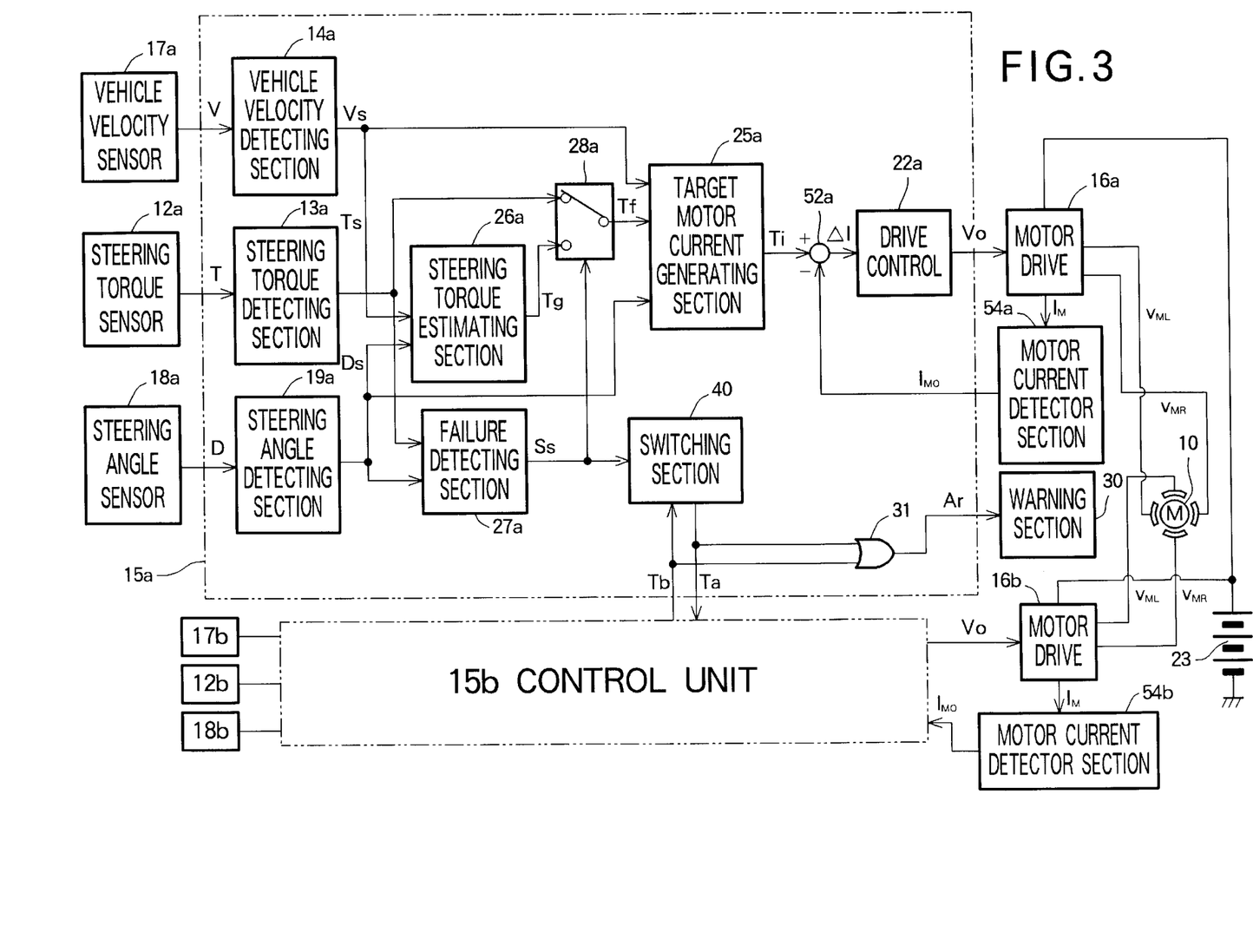
FIG. 3 is a block diagram showing principal electrical components of the electric power steering apparatus in accordance with a second embodiment of the present invention.

FIG. 3 is a block diagram showing principal electrical components of the electric power steering apparatus in accordance with a second embodiment of the present invention. The electric power steering apparatus of FIG. 3 comprises duplicate sets of steering torque sensors 12a, 12b, vehicle velocity sensors 17a, 17b, steering angle sensors 16a, 16b, control units 15a, 15b, motor drives 16a, 16b and motor current detector sections 54a, 54b, a warning section 30 and a motor driving power supply 23.

The main control unit 15a, preferably implemented by a microprocessor, comprises a steering torque detecting section 13a, a vehicle velocity detecting section 14a, a steering angle detecting section 19a, a target motor current generating section 25a, a steering torque estimating section 26a, a motor drive control section 22a, a failure detecting section 27a, a subtracter 52a and a selector switch 28a, similarly to the control unit 15 of the first embodiment.

In the case of a slight failure in the main control unit 15a, there will occur no significant change in the amount of steering assist from the motor 10, although the steering feel will be deteriorated due to a loss of some of the sensor signals to be used for the control of the motor 10. However, in the case of a relatively great failure, the control unit 15a controls the motor 10 to reduce its steering assist, by generating a motor control signal intended for a reduced assist ratio, so that at least the vehicle driver may become aware of the failure from a change in the steering feel. Once the main control unit 15a completely breaks down, a shift is made from the main control unit 15a to the subsidiary control unit 15b so that the subsidiary control unit 15b start controlling the motor 10, in place of the main control unit 15a, on the basis of detected steering torque. This duplicate arrangement provides for uninterrupted controlled operation of the assisting motor 10.

When the associated steering torque sensor 12a is not working, the control unit 15a calculates estimated steering torque on the basis of a vehicle velocity detection signal Vs from the vehicle velocity detecting section 14a and a steering angle detection signal Ds from the steering angle detecting section 19a, so as to control the motor 10 on the basis of the estimated steering torque, vehicle velocity and steering torque angle.

The steering torque detecting section 13a generates a steering torque detection signal Ts and a direction signal on the basis of the absolute value of the steering torque signal T from the sensor 12a, which are fed via the selector switch 28a to the target motor current generating section 25a for motor torque control and are also sent to the failure detecting section 27a. The vehicle velocity detecting section 14a generates a vehicle velocity detection signal Vs and a direction signal on the basis of the absolute value of the vehicle velocity signal V from the sensor 17a, which are fed to the target motor current generating section 25a for motor torque control corresponding to the vehicle velocity and are also sent to the steering torque estimating section 26a. Further, the steering angle detecting section 19a generates a steering angle detection signal Ds and a direction signal on the basis of the absolute value of the steering angle signal from the sensor 18a, which are fed to the steering torque estimating section 26a for motor torque control corresponding to the vehicle velocity and are also sent to the failure detecting section 27a.

The steering torque estimating section 26a is similar in construction to the steering torque estimating section 26 of the first embodiment and will be described below with reference to FIG. 4. The section 26a includes a memory, such as a ROM 26d, a differentiator section 27c and an arithmetic operator section 27e, as shown in FIG. 4. The steering torque estimating section 26a generates first estimated torque Ts1 corresponding to the vehicle velocity detection signal Vs and a steering angle θs calculated from the steering angle detection signal Ds, and second estimated torque Ts2 corresponding to the vehicle velocity detection signal Vs and a steering angle acceleration of the steering angle θs calculated from the steering angle detection signal Ds. The steering torque estimating section 26a then multiplies the first and second estimated torque Ts1 and Ts2 by first and second coefficients k1 and k2, respectively, where the second coefficient k2 is four times as great as the first coefficient k1 (k2=4k1). This way, the steering torque estimating section 26a adds together the multiplication results to output an estimated torque signal Tg (=k1×Ts1+k2×Ts2) to the selector switch 28a.

Further, the ROM 26d of the steering torque estimating section 26a has prestored therein still another table which, as shown in FIG. 6A, contains values of first estimated road-surface friction coefficient μ1 that correspond to various possible values of the vehicle velocity detection signal Vs and the steering angle θs calculated from the steering angle detection signal Ds and that were obtained through experiments or logical operations. Thus, the steering torque estimating section 26a selectively reads out one of the first estimated road-surface friction coefficient values μ1 corresponding to the digitally-converted values of the input vehicle velocity signal V and steering angle signal D. Also, the ROM 26d has prestored therein still another table which, as shown in FIG. 6B, contains values of second estimated road-surface friction coefficient μ2 that correspond to various possible values of the vehicle velocity detection signal Vs and the steering angle acceleration calculated by twice differentiating the steering angle θs and that were obtained through experiments or logical operations. Thus, the steering torque estimating section 26a selectively reads out one of the second estimated torque values Ts2 corresponding to the digitally-converted values of the input vehicle velocity signal V and steering angle signal D. Then, the steering torque estimating section 26a modifies the first and second estimated road-surface friction coefficients μ1 and μ2 in correspondence with the earlier-selected first and second estimated torque values Ts1 and Ts2, to thereby provide the estimated torque signal Tg.

The failure detecting section 27a, which comprises an OR gate, performs an OR operation between the steering torque detection signal Ts from the steering torque detecting section 13a and the steering angle detection signal Ds from the steering angle detecting section 19a. Thus, when the steering angle detection signal Ds is being output with no output of the steering torque detection signal Ts (Ts=0), the failure detecting section 27a determines that the steering torque sensor 12a is not working and outputs a failure signal Ss to the warning section 30, selector switch 28 and a switching section 40.

The selector switch 28a, having a software-controlled 20 switching function, operates to select the steering torque detection signal Ts when no failure signal Ss is given from the failure detecting section 27a, i.e., when the steering torque sensor 12a is functioning properly, but select the estimated steering torque signal Tg when the failure signal Ss is given from the failure detecting section 27a, i.e., when the steering torque sensor 12a is not working. The signal Ts or Tg thus selected by the selector switch 28a is then passed to the target motor current generating section 25a as a selected steering torque signal Tf.

The target motor current generating section 25a includes a memory, such as a ROM, storing a table which, as shown in FIG. 7, contains values of target motor current Ti1 that correspond to various possible values of the vehicle velocity signal V and the steering torque signal T and that were obtained through experiments or logical operations on the basis of the selected steering torque signal Tf passed via the selector switch 28a and the vehicle velocity detection signal Vs. Thus, the target motor current generating section 25a selectively reads out one of the target motor current values Ti1 corresponding to the input vehicle velocity detection signal Vs and selected steering torque signal Tf (Ts or Tg) based on the steering torque T and sends it to the subtracter 52a.

Figure 8:
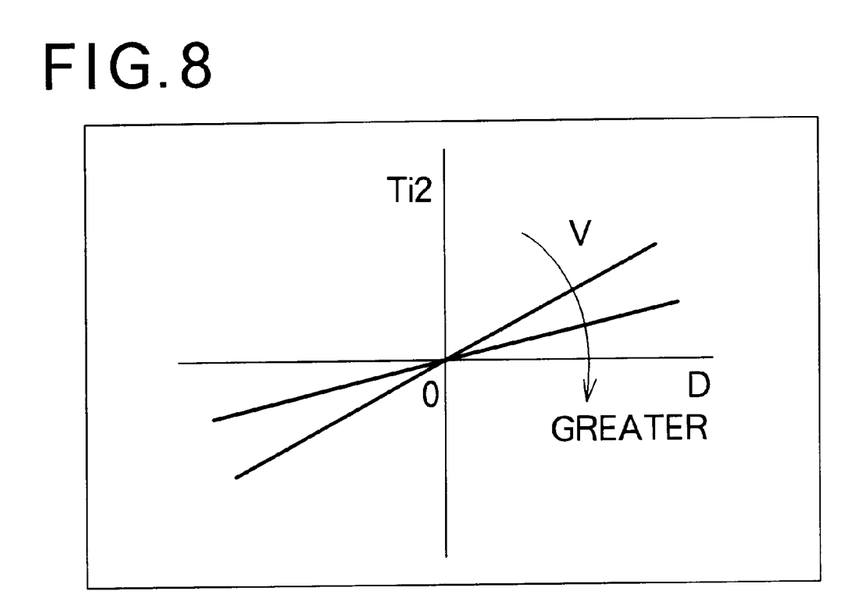
FIG. 8 is a graph showing a characteristic curve of target motor current versus vehicle velocity and steering angle tabled in the target motor current generating section.

The memory of the target motor current generating section 25a also stores a table which, as shown in FIG. 8, contains values of target motor current Ti2 that correspond to various possible values of the vehicle velocity signal V and the steering angle signal D and that were obtained through experiments or logical operations on the basis of the steering angle detection signal Ds and the vehicle velocity detection signal Vs. Thus, the target motor current generating section 25a selectively reads out one of the target motor current values Ti2 corresponding to the input vehicle velocity detection signal Vs and selected steering torque signal Tf (Ts or Tg) based on the steering angle detection signal Ds.

Further, the target motor current generating section 25*a* the second embodiment subtracts the target motor current Ti2 from the target motor current Ti1, to there by provide the difference (Ti1−Ti2) to the subtracter 52*a* as a target motor current value Ti for an outward (away from the center toward one of the full lock positions) or return motion of the steering wheel 2.

The subtracter 52*a* subtracts the detected motor current $I_{MO}$, given from the motor current detector section 54*a*, from the target motor current Ti, to thereby output a difference or offset signal ΔI (=Ti −$I_{MO}$) to the drive control section 22*a*. In accordance with the offset signal ΔI, the drive control section 22*a* generates a motor control signal Vo to be supplied to the motor drive 16*a* for driving the assisting motor 10.

The switching section 40, which includes an oscillator circuit, a comparator circuit and so forth, outputs a control shift signal Ta to the subsidiary control unit 15*b*, in response to the failure signal Ss generated by the failure detecting section 27*a* or the like when the main control unit 15*a* or its associated sensors are not working or in an unusual condition, so that the subsidiary control unit 15*b* takes over the control from the main control unit 15*a*. The switching section 40 also receives a similar control shift signal Tb from the subsidiary control unit 15*b* when the control unit 15*b* or its associated sensors are not working or in an unusual condition. The control shift signals Ta and Tb are delivered to two inputs of an OR gate 31, so that the OR gate 31 outputs a failure detection signal Ar to the warning section 30 when at least one of the main and subsidiary control units 15*a* and 15*b* are not working. Preferably, the switching section 40 ranks various failures of the sensors and other components in accordance with the locations and degrees of the failures and executes a predetermined mode conversion depending on the ranking of the detected failure.

Upon receipt of the failure detection signal Ar from the OR gate 31, the warning section 30 warns the vehicle driver and passengers of the unusual condition, i.e., failure, via visual and/or aural displays; the visual display may be by illuminating or flickering a warning lamp and the aural display may be by sounding a buzzer or generating an optional warning sound through a speaker.

Although not specifically described, the subsidiary control unit 15*b* is constructed in a similar manner to the main control unit 15*a* except that a failure signal from its failure detecting section (not shown), corresponding to the failure detecting section 27*a* of the main control unit 15*a*, is delivered to the switching section 40 as noted earlier.

As described above, the electric power steering apparatus in accordance with the second embodiment of the present invention is characterized in that it includes duplicate sets of the steering torque sensors 12*a*, 12*b*, vehicle velocity sensors 17*a*, 17*b*, steering angle sensors 16*a*, 16*b*, control units 15*a*, 15*b*, motor drives 16*a*, 16*b* and motor current detector sections 54*a*, 54*b* for the fail-safe purposes, and that when the steering torque sensor is not working, each of the control units 15*a* and 15*b* controls the operation of the assisting motor 10 on the basis of estimated steering torque calculated by the steering torque estimating section 26 on the basis of a detected vehicle velocity and steering angle, with the result that the controlled operation of the motor 10 can be continued irrespective of the failure of the steering torque sensors.

In summary, the electric power steering apparatus of the present invention having so far been described is characterized in that it includes a steering torque estimating section for estimating steering torque on the basis of a vehicle velocity detected by the vehicle velocity sensor and a steering angle detected by the steering angle sensor. When the steering torque sensor is out of order or not working, the control unit controls the operation of the electric motor on the basis of the steering torque estimated by the steering torque estimating section. Thus, controlled operation of the electric power assisting motor can be continued irrespective of a failure of the steering torque sensor, and a good steering feel is always achieved without requiring increased cost. As a result, it is possible to provide an electric power steering apparatus which achieves enhanced reliability and cost performance.

What is claimed is:

1. An electric power steering apparatus for use with an automotive vehicle, comprising:

an electric motor for applying an electric steering assist to a steering system of the vehicle;

a steering angle sensor for detecting a steering angle in the steering system;

a steering torque sensor for detecting steering torque in the steering system;

a vehicle velocity sensor for detecting a velocity of the vehicle;

a control unit for setting a motor control signal to control operation of said electric motor on the basis of at least the steering torque detected by said steering torque sensor and the vehicle velocity detected by said vehicle velocity sensor;

a motor drive for driving said motor on the basis of the motor control signal set by said control unit; and a steering torque estimating section provided in said control unit for estimating the steering torque on the basis of the vehicle velocity detected by said vehicle velocity sensor and the steering angle detected by said steering angle sensor and not on the basis of the steering torque detected by the said steering torque sensor, whereby when said steering torque sensor is judged to be malfunctioned, said control unit controls the operation of said electric motor on the basis of the steering torque estimated by said steering torque estimating section.

2. An electric power steering apparatus as recited in claim 1 wherein said steering torque estimating section estimates the steering torque by calculating a sum between a value corresponding to the vehicle velocity and the steering angle and a value corresponding to the vehicle velocity and twice differentiated steering angle and modifying the calculated sum.

* * * * *